(12) United States Patent
Diserio

(10) Patent No.: US 10,479,456 B1
(45) Date of Patent: *Nov. 19, 2019

(54) DECK STRUCTURE

(71) Applicant: Lucas Diserio, Wellsburg, WV (US)

(72) Inventor: Lucas Diserio, Wellsburg, WV (US)

(73) Assignee: American Muscle Docks & Fabrication LLC, Wellsburg, WV (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/006,001

(22) Filed: Jun. 12, 2018

Related U.S. Application Data

(62) Division of application No. 15/015,678, filed on Feb. 4, 2016, now Pat. No. 10,017,230.

(60) Provisional application No. 62/111,887, filed on Feb. 4, 2015.

(51) Int. Cl.
*B63B 35/73* (2006.01)
*B63C 1/02* (2006.01)
*B63B 27/14* (2006.01)

(52) U.S. Cl.
CPC ............. *B63B 35/73* (2013.01); *B63B 27/14* (2013.01); *B63C 1/02* (2013.01)

(58) Field of Classification Search
CPC ... B63B 2029/022; B63B 27/14; B63B 35/34; B63B 35/36; B63B 35/38; B63C 1/02; E01D 15/00; E01D 15/12; E01D 15/133; E01D 15/14; E01D 15/20; E01D 19/02; E01D 19/06; E01D 19/062; E01D 19/065; E01D 19/067
See application file for complete search history.

(56) References Cited

U.S. PATENT DOCUMENTS

| | | |
|---|---|---|
| 3,157,144 A | 11/1964 | De Jarnett |
| 3,289,621 A | 12/1966 | Sebring |
| 3,616,774 A | 11/1971 | Thompson |
| 4,260,293 A | 4/1981 | Peterson |
| 4,316,426 A | 2/1982 | Meeusen |
| 4,622,792 A | 11/1986 | Betts |
| 4,660,495 A | 4/1987 | Thompson |
| 4,867,093 A | 9/1989 | Sullivan |
| 4,928,617 A | 5/1990 | Merriwether |
| 4,965,903 A | 10/1990 | Bish |
| 5,048,448 A | 9/1991 | Yoder |
| 5,156,493 A | 10/1992 | Johnson |
| 5,412,915 A | 5/1995 | Johnson |
| 5,788,416 A | 8/1998 | Wolgamot |
| 6,128,880 A | 10/2000 | Meenan, Jr. |
| 6,695,541 B1 | 2/2004 | Spence |

(Continued)

*Primary Examiner* — Ajay Vasudeva
(74) *Attorney, Agent, or Firm* — Alvin Rockhill

(57) ABSTRACT

The subject invention relates to a method for affixing two or more structures to be used in connection with a floating dock, stationary dock, gang plank, swim platform, or the like. The subject invention more specifically discloses a deck structure which is comprised of one or more sections which are adapted to be interconnected, wherein said sections are comprised of a frame, and a deck, wherein the frame is comprised of a first box-channel on a first side of the frame, a second box-channel on the second side of the frame, and at least two self-squaring cross braces, wherein the self-squaring cross braces are attached to both the first side and the second side of the frame, and wherein the deck is attached to the top side of the frame.

15 Claims, 6 Drawing Sheets

(56) References Cited

U.S. PATENT DOCUMENTS 9,121,154 B1     9/2015   Johnson
10,017,230 B1 *   7/2018   Diserio .................. E02B 3/068

* cited by examiner

DECK STRUCTURE

This is a divisional of U.S. patent application Ser. No. 15/015,678, filed on Feb. 4, 2016, which claims the benefit of U.S. Provisional Patent Application Ser. No. 62/111,887, filed on Feb. 4, 2015. The teachings of U.S. Provisional Patent Application Ser. No. 62/111,887 and U.S. patent application Ser. No. 15/015,678 are incorporated herein by reference in their entirety.

FIELD OF THE INVENTION

This invention relates to an improved technique for affixing two or more structures which include self-squaring cross braces, such as segments of decking. More specifically, it relates to an improved method for affixing two or more structures to be used in connection with a marine dock structure, such as a boat dock, stationary dock, gang plank, swim platform, or the like.

BACKGROUND OF THE INVENTION

Installing docks, piers, swim platforms, and gang planks is often a complicated, time consuming, and messy process. For instance, building these structures typically requires multiple persons using ratchets, clamps, chains, and various other tools in an effort to obtain a structure that is properly aligned and level. Some structural designs require the builder to enter the water in which the structure will stand, and it is not uncommon for these builders to become completely or partially submerged in the water and in some cases can lose valuable equipment while installing a dock, pier, swim platform, gang plank, or other similar structures.

Because gang planks, piers and docks are generally built to facilitate the transportation of goods and persons over water or wetlands, it is critical to avoid mistakes during installation because mistakes can cause individuals or valuables to fall and/or become lost. In other words, mistakes during installation which cause the structure to be uneven, unstable, or otherwise unsound can be both disastrous and costly. Correcting such problems associated with improper installation can also be difficult, time consuming and costly.

Appropriately, docks, planks, swim platforms, or other similar structures must be reliable, durable, safe, mobile, and aesthetically pleasing. Reliability is especially important to weak swimmers who rely upon such structures to keep them from falling into water and in a terrible scenario drowning. Such structures are also frequently relied upon as a device for leaving water and again must be reliable to protect people from drowning. It is also critical that such structures be durable against damage from repetitive and continuous use, and damage from the elements. These structures are frequently kept outdoors and accordingly can be exposed to a multitude of weather conditions over extended periods of time.

Deterioration occurs more rapidly when docks, piers, swim platforms and the like are held underwater because they are more susceptible to widespread invasion by aquatic life, damage from debris, and corrosion from prolonged exposure to water (i.e. rust). Therefore, it is important that docks, piers, and swim platforms have the ability to rise and fall to meet changes in water level, so that these structures are not held under water at periods of time when the water level might normally surpass the top of the structure.

It can be necessary to remove docks, piers, swim platforms, and gang planks in order to protect them from seasonal changes (i.e. freezing water). It may also be desirable to remove or disassemble any of these structures for cleaning, repair, or during periods of non-use. For this reason, it is advantageous that such structures can be taken apart or modified easily. Furthermore, it is advantageous that such structures have the ability to stack or be compiled for compact storage. These features improve the overall mobility of a given structure, and are therefore desirable to consumers.

Individuals may require multiple uniquely sized docks, piers, swim platforms, or gang planks in order to accommodate variously sized water crafts, multiple water crafts, or to fit around certain objects (i.e. large stones, fallen trees, and man-made articles). Today most of these types of structures cannot be modified with ease, or they are capable of only limited modifications.

There is a continuing effort to make improvements upon existing designs for docks, piers, planks, platforms and other similar structures. In particular, there is a need for structures which can be transported as a kit of component parts that can be easily constructed into customized configurations. It would be of added benefit if such a structure, such as a dock, pier, gang plank, swim platform, or the like, could be assembled into the desired configuration by a single person without needing the assistance of others.

SUMMARY OF THE INVENTION

The frame of this invention would typically be made from steel which has been welded by metal inert gas welding (MIG), also known as gas metal arc welding (GMAW), in a manner which meets the standards of the American Society of Welders (ASW). Other similar processes may also be used to weld the metal frames of this invention. Bolt connection points are punched into the frame by standard means; connection points allow for multiple frames to be bolted together as desired. The steel frame and all connecting fasteners are generally hot-dip galvanized (HDG), in accordance with the American Society for Testing and Materials (ASTM).

The frames of this invention are uniquely designed to allow for the easy assembly of a gang plank, dock, pier, swim platform, or any similar structure; including stationary docks, ramps, or bridges. These frames include cross-brace mounting brackets, which are screwed, bolted or otherwise fastened together. The cross-brace mounting brackets are generally situated near the ends of the box-channels, but other arrangements are possible. These frames are beneficial because they allow a given structure to be uniquely modified to fit different environments and individualized consumer needs. For example, the frames can be fitted with different floatation devices, rollers, mooring pole hardware, various decking materials, and they can be connected in numerous arrangements. More specifically, the frames of this invention can be connected to build structures around objects in the water or wetlands, and they can connect to accommodate individual or multiple watercrafts of various sizes.

The frames can be oriented to align sections of the structure in a parallel or perpendicular orientation with respect each section. This feature of the invention allows any structure to be easily modified or customized to accommodate variously sized water crafts, or otherwise to be assembled in any manner desirable. The completed structure (gang plank, dock, pier swim platform, etc.) may include one or more sections. These sections can be adapted to include floatation devices, rollers, and/or articulating or non-articulating connection hardware. Typically the frames of this invention will be fitted with a wood deck covering, but any suitable material can be used to form the surface on the structure. The deck planks may be attached to the frame(s) of a given structure with self-tapping and self-drilling screws The present invention more specifically discloses a deck structure, which is comprised of one or more sections which are adapted to be interconnected, wherein said sections are comprised of a frame, and a deck, wherein the frame is comprised of a first box-channel on a first side of the frame, a second box-channel on the second side of the frame, and at least two self-squaring cross braces, wherein the self-squaring cross braces are attached to both the first side and the second side of the frame, and wherein the deck is attached to the top side of the frame. One or more floats or anchors may be attached to the bottom side of the frame, depending upon the nature of the structure being built.

The subject invention allows each section of a given structure to be interconnected in a manner that allows the overall structure to be assembled and disassembled efficiently. Furthermore, the interconnections are designed to reliably connect so that each section fits together neatly to create a level and aligned finished structure. In other words, the sections of this structure are self-aligning; thereby saving installation time and reducing the complexity of the process. Once the structure is disassembled, each section can be stacked on top of one other for easy and compact storage.

The present invention further reveals a deck structure kit which is comprised of at least two box-channels, at least two cross braces, wherein the box-channels and the cross-braces are adapted for being attached together in a self-squaring manner to affix the box-channels in a parallel orientation with respect to each other to form a structural frame section having a top side and a bottom side, wherein the frame section is adapted for at least one float to be attached to the bottom side thereof, and wherein the frame is adapted for a deck to be attached to the top side thereof. A box-channel may also be known as a C-channel, or an open seam-square or rectangular tubing. Furthermore, the deck kit may include mooring hardware, or articulating or non-articulating hardware, depending upon the nature of the structure being built.

The subject invention also teaches a method for constructing a deck structure which comprises a kit of at least two box-channels, at least two cross braces, and at least one float, wherein the box-channels and the cross-braces are adapted for being attached together in a self-squaring manner to affix the box-channels in a parallel orientation with respect to each other to form a structural frame section having a top side and a bottom side, wherein the frame section is adapted for at least one float to be attached to the bottom side thereof, and wherein the frame is adapted for a deck to be attached to the top side thereof. Said method includes, attaching the cross-braces to both the first box-channels and the second box-channels to produce the dock frame section, attaching at least one floats to the bottom side of the frame section, and attaching a deck to the top side of the structural frame section.

The present invention further discloses a deck structure kit which is comprised of at least two box-channels, at least two cross braces, at least one floatation device, and at least one set of rollers, wherein the box-channels and the cross-braces are adapted for being attached together in a self-squaring manner to affix the box-channels in a parallel orientation with respect to each other to form a structural frame section having a top side and a bottom side, wherein at least one frame section is adapted for at least one float to be attached to the bottom side thereof, wherein at least one frame section is adapted for the attachment of at least one set of rollers, and wherein the frame is adapted for a deck to be attached to the top side thereof. The kit can also include component parts which are designed for attaching mooring poles, or articulating or non-articulating connection hardware.

BRIEF DESCRIPTIONS OF THE DRAWINGS

DETAILED DESCRIPTIONS OF THE INVENTION

Figure 1:
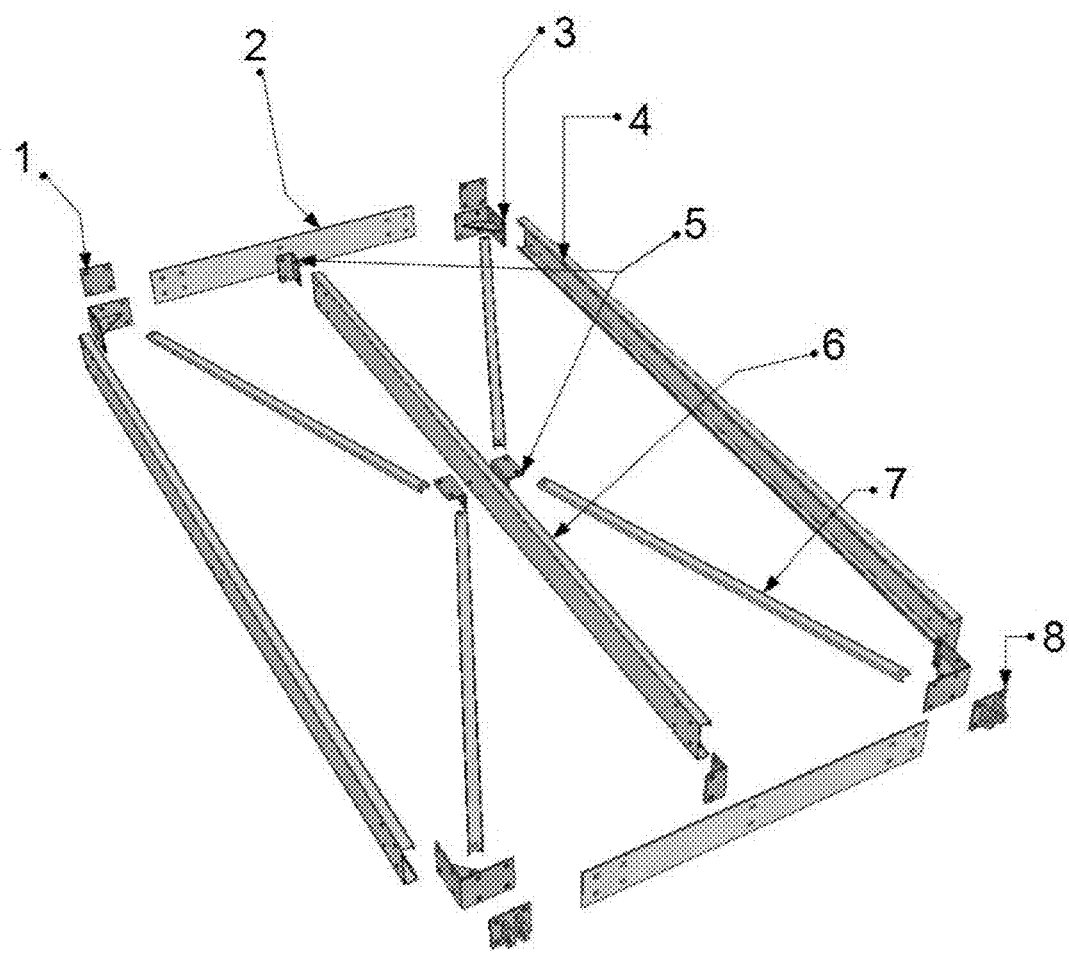
FIG. 1 depicts the frame of one section of a structure such as a gang plank, pier, dock, or swim platform, wherein the frame contains a center support plate.

As shown in FIG. 1, the frame is designed to have both "male" 1 and "female" 8 connecting parts to allow for each section of a structure (ex: gang plank, dock, pier, swim platform, etc.) to securely lock into place. In one embodiment of this invention the frame contains male 1 and female 8 parts which are both $3/16^{th}$ of an inch (0.48 cm) thick, and 5.0 inches (12.7 cm) long by 5.0 inches (12.7 cm) tall. The female 8 connecting parts include two 0.50 inch (1.27 cm) connecting tabs, while the male 1 connecting parts include one 0.75 inch (1.91 cm) connecting tab. The male 1 and female 8 connecting parts of the metal frame are designed to ensure that any structure being created is properly and easily aligned.

FIG. 1 depicts one embodiment of this invention in which the frame can be created using two end plates 2, and two side plates 4 which have been formed into a "C" channel. The end plates 2 of the steel frame are made of 13 gauge steel, and they are 4.0 feet (1.22 m) long by 6.0 inches (15.24 cm) tall; and the side plates 4 of the frame are formed into a box-channel and are 10.0 feet (3.05 m) long by 6.0 inches (15.24 cm) tall, with a 1.75 inch (4.45 cm) lip along both edges of the length of the side plate 4. The center of the frame includes supporting plates; center supports can be added or modified to accommodate variously sized frames. For example, the frame can contain one center support plate 6. The center support plate can be 10.0 feet (3.05 m) long, by 1.75 inches (4.45 cm) wide, by 6.0 inches (15.24 cm) tall. The center support plate is usually supported by four truss braces 7 extending at an angle from each corner 3 of the frame. These truss braces 7 are generally 1.5 inches (3.81 cm) long by 0.5 inches (1.27 cm) wide, they are formed into a "C" channel. The truss braces 7 are attached to each corner of the frame by gusseted inside corners 3 constructed of 0.19 inch (0.48 cm) steel. The truss braces 7 and the center support plate 6 of this invention are connected by 0.19 inch (0.48 cm) steel angles 5 designed for horizontal diagonal truss bracing and center support attachment.

As clearly illustrated in FIG. 1 the frame is comprised of a first box-channel on a first side of the frame, a second box-channel on the second side of the frame, a center support plate, a first steel angle which is attached to a first side of the center support plate at a point which is midway between the two ends of the center support plate, a second steel angle which is attached to an opposing side of the center support plate at a point which is midway between the two ends of the center support plate, and four self-squaring cross braces, wherein the self-squaring cross braces are attached to both the first side and the second side of the frame, wherein the four self-squaring cross braces support the center support plate and include (1) a first self-squaring cross brace that extends from a first end of the first box-channel to the first steel angle; (2) a second self-squaring cross brace that extends from a second end of the first box-channel to the first steel angle; (3) a third self-squaring cross brace that extends from a first end of the second box-channel to the second steel angle; and (4) a fourth self-squaring cross brace that extends from a second end of the second box-channel to the second steel angle, wherein the first box-channel and the second box-channel include cross-brace mounting brackets which are oriented to align the center support plate in a parallel orientation with respect to the first box-channel and the second box-channel.

Figure 3:
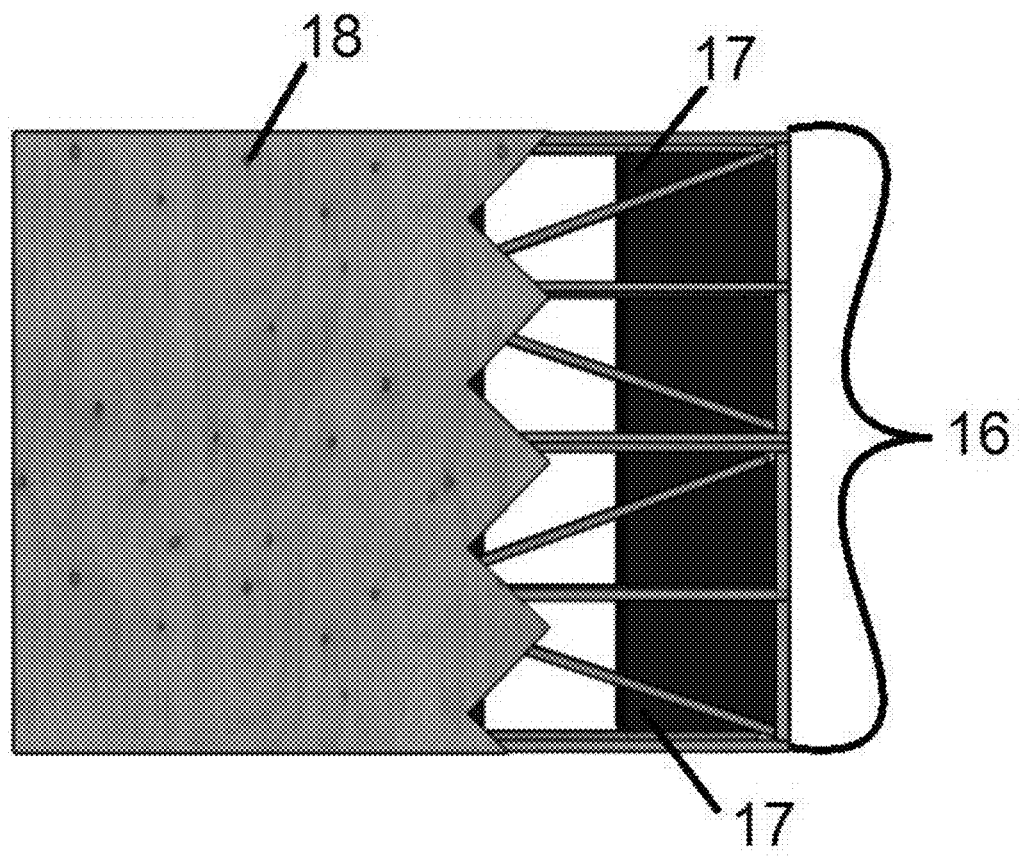
FIG. 3 shows the frame of FIG. 1, connected with other frames to form a swim platform.

FIG. 3 provides one example of a swim platform, created using the steel framing shown in FIG. 1. The swim platform utilizes two 4.0 feet (1.22 m) by 10.0 feet (3.05 m) steel frame sections 16 which connect to create one swim platform that is approximately 8.0 feet (2.44 m) wide by 10.0 feet (3.05 m) long. Optionally wood may be attached to the sections to create a deck 18; any other suitable substrate may be used to establish a surface on the frame. Floatation devices 17 are located underneath the frame; these devices allow the structure to rise and fall with changing water levels.

Figure 2:
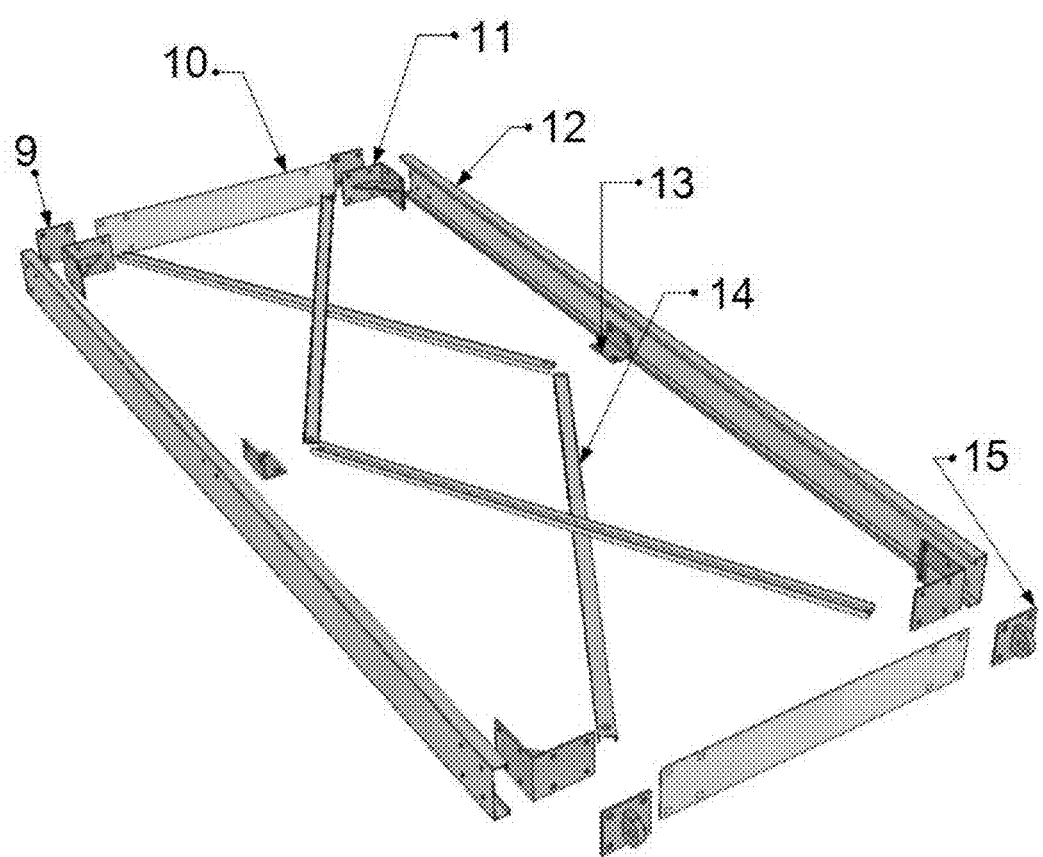
FIG. 2 illustrates the frame of one section of a structure such as a gang plank, pier, dock, or swim platform, wherein the frame contains four truss braces in lieu of a center support plate.

In another embodiment of this invention illustrated by FIG. 2, the steel frame can be created using two end plates 10, and two side plates 12 with have been formed into a "C" channel. The end plates 10 of this frame are generally made of 13 gauge steel, and they are 3.0 feet long (0.91 m) by 6.0 inches (15.24 cm) tall. The side plates 12 of this frame are formed into a "C" channel and can be 10.0 feet (3.05 m) long by 6.0 inches (15.24 cm) tall, with a 1.75 inch (4.45 cm) lip along both edges of the length of the side plate. The center of the frame includes supporting structures which can be modified to accommodate variously sized structures. For example, the frame can contain 4 truss braces 14 extending from each corner of the frame and connecting to the side plates 12. The 4 truss braces 14 are generally 1.5 inches (3.81 cm) long by 0.5 inches (1.27 cm) wide, they are formed into a "C" channel. The truss braces 14 are attached to each corner of the frame by gusseted inside corners 11 constructed of 0.19 inch (0.48 cm) steel, and they are attached to the side plates by 0.19 inch (0.48 cm) steel angles 13 designed for horizontal diagonal truss bracing and center support attachment. This frame is designed to have both "male" 15 and "female" 9 connecting parts which are both 0.19 of an inch (0.48 cm) thick, and 5.0 inches (12.7 cm) long by 5.0 inches (12.7 cm) tall. The female 9 parts include two 0.5 inch (1.27 cm) connecting tabs, while the male 15 parts include one 0.75 inch (1.91 cm) connecting tab. The male 15 and female 9 parts of the frame are designed to ensure that any structure being created is properly and easily aligned during installation.

Figure 4:
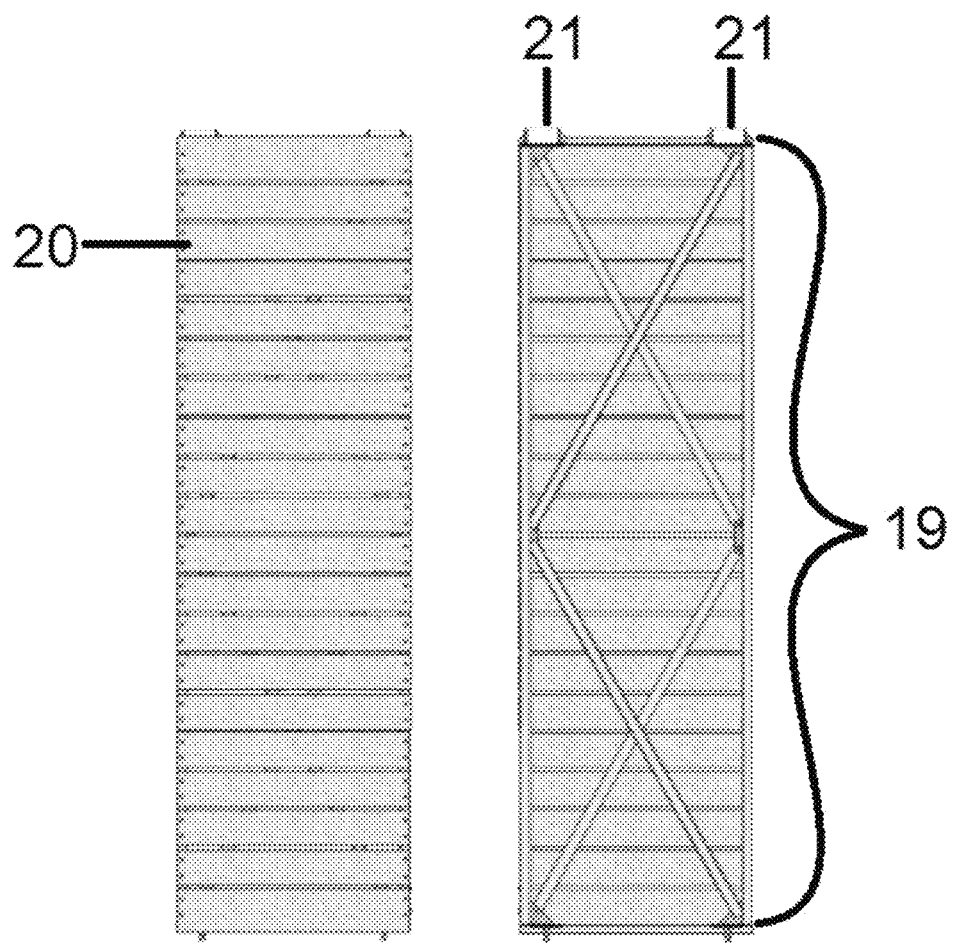
FIG. 4 shows the frame of FIG. 2, connected with another frame to form a gang plank.

FIG. 4 provides one example of a gang plank, created using the steel framing shown in FIG. 2. The gang plank utilizes two steel frame sections 19 which connect to create one gang plank that is approximately 3.0 feet (0.91 m) wide by 10.0 feet (3.05 m) long. The gang plank includes rollers 21 on one side. Alternative embodiments can include floatation devices in lieu of rollers, and/or articulating or non-articulating connection hardware. The gang plank may also include hardware for affixing mooring poles, such as clamps. Optionally wood may be attached to the sections to create a deck 20, but any other suitable substrate may be used to establish gang plank surface. The gang plank may be used in conjunction with the dock described herein.

Figure 5:
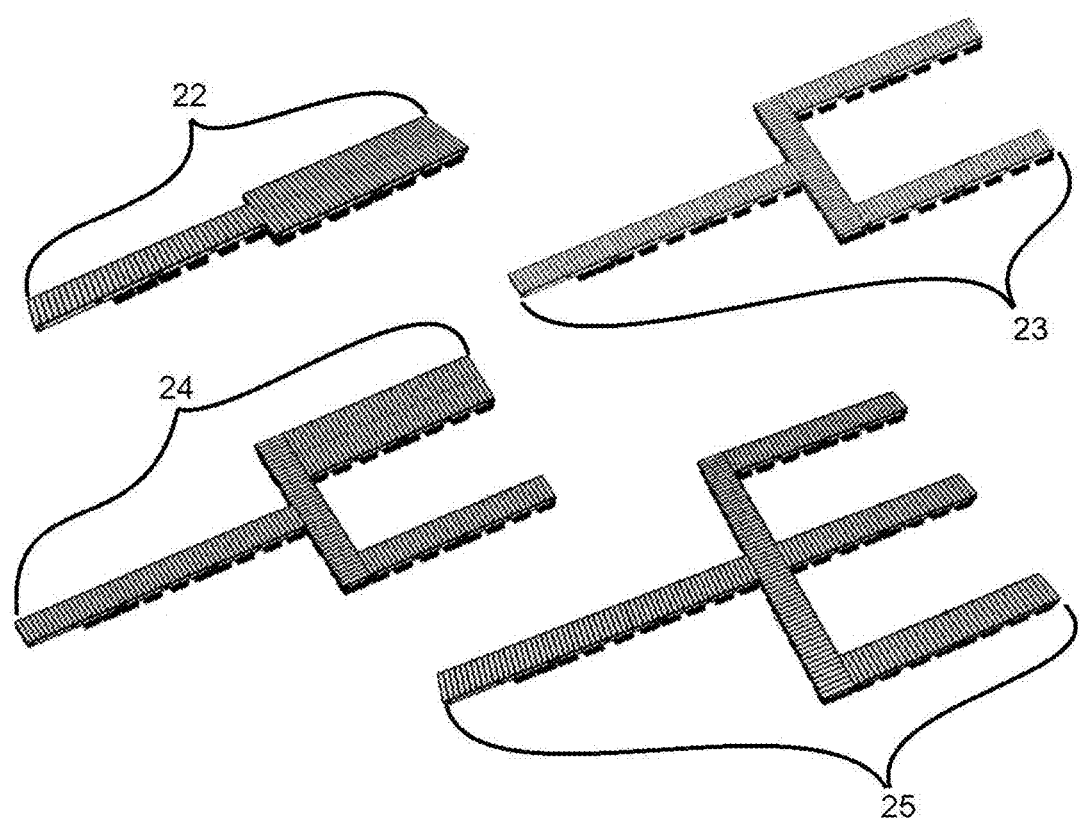
FIG. 5 depicts a variety of dock assemblies that are made possible with this invention.
Figure 6:
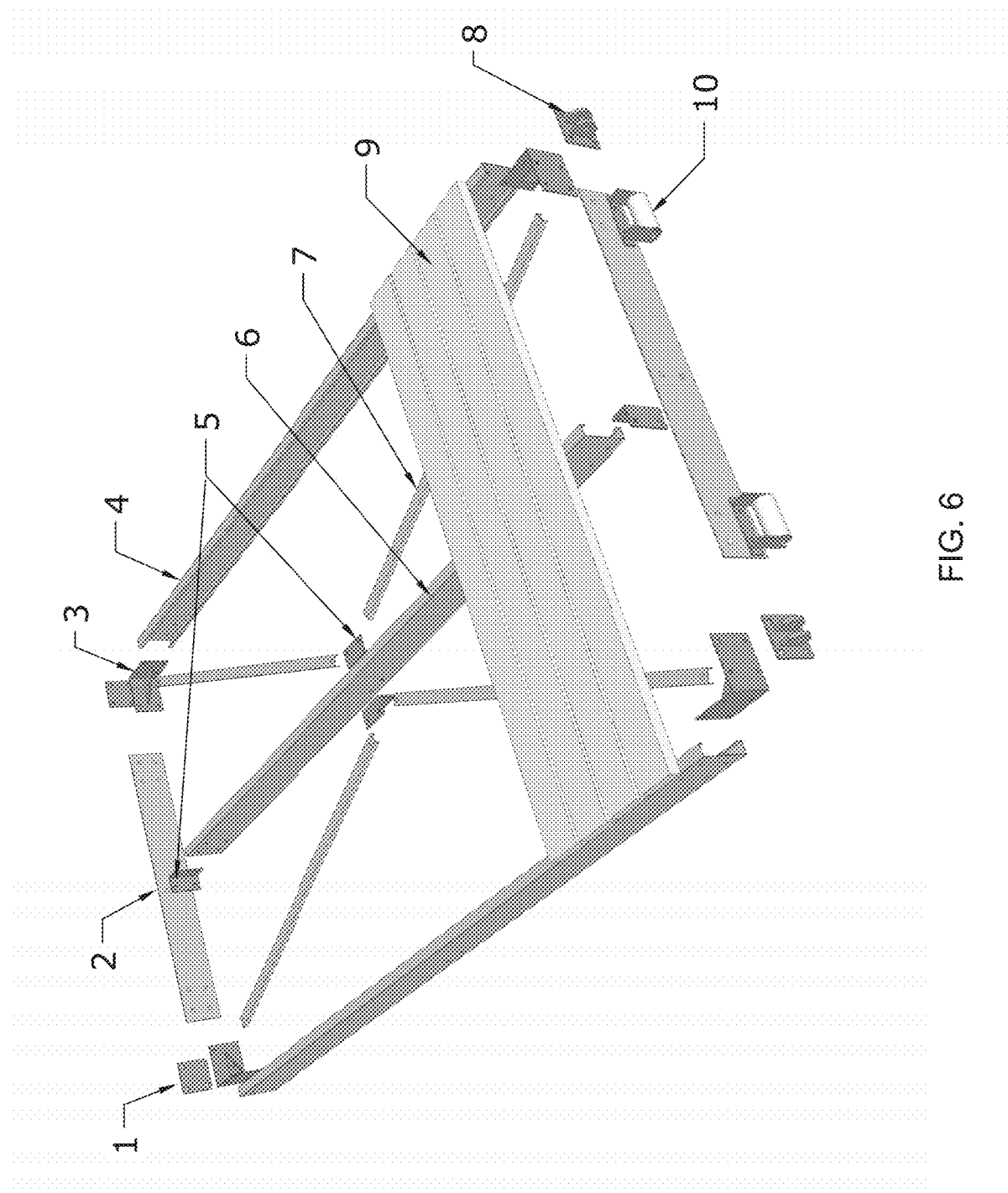
FIG. 6 depicts a gang plank of this invention having a plurality of planks as its deck and having rollers which are attached to the gang plank.

FIG. 5 provides an example of several embodiments of docks made using this invention. More specifically, this figure shows a basic dock 22, a U-dock 23, another variation of the U-dock 24, and a Finger U-Dock 25. These docks are made by connecting steel frames shown in FIGS. 1 and 2. Each dock is between 15 feet (4.57 m) and 40 feet (12.19 m) long, and between 5 feet (1.52 m) and 25 feet (7.62 m) wide. The lengths, widths, and arrangements of the docks can be modified to match the needs of the individuals using the docks. Any of these docks may be utilized on dry land, wetlands, or over water by incorporation or eliminating floatation devices.

While certain representative embodiments and details have been shown for the purpose of illustrating the subject invention, it will be apparent to those skilled in this art that various changes and modifications can be made therein without departing from the scope of the subject invention.

What is claimed is:

1. A marine deck structure kit which can be assembled into one or more sections which are adapted to be interconnected, said sections being comprised of a frame and a deck, said kit being comprised of components for assembly into the frame including a first box-channel which is adapted to form a first side of the frame, a second box-channel which is adapted to form a second side of the frame, a first end plate which is adapted to form a first end of the frame, a second end plate which is adapted to form a second end of the frame, a center support plate, a first steel angle which is adapted for attachment to a first side of the center support plate at a point which is midway between the two ends of the center support plate, a second steel angle which is adapted for attachment to an opposing side of the center support plate at a point which is midway between the two ends of the center support plate, and four self-squaring cross braces, wherein the self-squaring cross braces are adapted for attachment to both the first side and the second side of the frame, wherein the four self-squaring cross braces are adapted to provide support for the center support plate and include (1) a first self-squaring cross brace that is adapted to extend from a first end of the first box-channel to the first steel angle; (2) a second self-squaring cross brace that is adapted to extend from a second end of the first box-channel to the first steel angle; (3) a third self-squaring cross brace that is adapted to extend from a first end of the second box-channel to the second steel angle; and (4) a fourth self-squaring cross brace that is adapted to extend from a second end of the second box-channel to the second steel angle, wherein the first box-channel and the second box-channel include cross-brace mounting brackets which are oriented to align the center support plate in a parallel orientation with respect to the first box-channel and the second box-channel, where the first box-channel and the second box-channel are of equal length; and said kit further being comprised of a multitude of planks which are adapted for attachment to the top side of the frame and which extend from the first side of the frame to the second side of the frame to form the deck.

2. The marine deck structure kit as specified in claim 1 wherein the box-channels and the cross-braces are adapted for being attached together in a self-squaring manner to affix the box-channels in a parallel orientation with respect to each other to form a structural frame section having a top side and a bottom side, and wherein the frame is adapted for a deck to be attached to the top side thereof.

3. The deck structure kit as specified in claim 1 wherein the kit is further comprised of at least one floatation device, and wherein the frame section is adapted for at least one float to be attached to the bottom side thereof.

4. The deck structure kit as specified in claim 1 wherein the kit is further comprised of articulating or non-articulating connection hardware.

5. The deck structure kit as specified in claim 1 which is further comprised of at least one floatation device and at least one means for affixing the deck structure to mooring poles, wherein the frame section is adapted for at least one float to be attached to the bottom side thereof.

6. The deck structure kit as specified in claim 1 which is further comprised of at least one floatation device and at least one set of rollers, wherein at least one frame section is adapted for at least one float to be attached to the bottom side thereof, wherein at least one frame section is adapted for the attachment of the rollers.

7. A method for constructing a structural frame section, wherein said structural frame section is adapted to be interconnected with additional structural frame sections, and wherein the structural frame section or one or more interconnected structural frame sections can be assembled into a marine deck structure, said method being comprised of the steps of (1) providing a first box-channel which is adapted to form a first side of the frame section, a second box-channel which is adapted to form a second side of the frame section, a first end plate which is adapted to form a first end of the frame section, a second end plate which is adapted to form a second end of the frame section, a center support plate, a first steel angle which is adapted for attachment to a first side of the center support plate at a point which is midway between the two ends of the center support plate, a second steel angle which is adapted for attachment to an opposing side of the center support plate at a point which is midway between the two ends of the center support plate, and four self-squaring cross braces, wherein the self-squaring cross braces are adapted for attachment to both the first side and the second side of the frame, wherein the four self-squaring cross braces are adapted to provide support for the center support plate and include (i) a first self-squaring cross brace that is adapted to extend from a first end of the first box-channel to the first steel angle; (ii) a second self-squaring cross brace that is adapted to extend from a second end of the first box-channel to the first steel angle; (iii) a third self-squaring cross brace that is adapted to extend from a first end of the second box-channel to the second steel angle; and (iv) a fourth self-squaring cross brace that is adapted to extend from a second end of the second box-channel to the second steel angle, wherein the first box-channel and the second box-channel include cross-brace mounting brackets which are oriented to align the center support plate in a parallel orientation with respect to the first box-channel and the second box-channel, where the first box-channel and the second box-channel are of equal length; (2) connecting a first end of the first end plate to the first end of the first box-channel through a first attachment angle; (3) connecting a second end of the first end plate to the first end of the second box-channel through a second attachment angle; (4) connecting a first end of the second end plate to the second end of the first box-channel through a third attachment angle; (5) connecting a second end of the second end plate to the second end of the second box-channel through a fourth attachment angle; (6) attaching the center support plate to the first end plate through a fifth attachment angle which is situated at a point which is midway between the first end of the first end plate and the second end of the first end plate; (7) attaching the center support plate to the second end plate through a sixth attachment angle which is situated at a point which is midway between the first end of the second end plate and the second end of the second end plate; (8) attaching the first self-squaring cross brace to extend from the first end of the first box-channel to the first steel angle; (9) attaching the second self-squaring cross brace to extend from a second end of the first box-channel to the first steel angle; (10) attaching the third self-squaring cross brace to extend from a first end of the second box-channel to the second steel angle; and (11) attaching the fourth self-squaring cross brace to extend from a second end of the second box-channel to the second steel angle, wherein the first box-channel and the second box-channel include cross-brace mounting brackets which are oriented to align the center support plate in a parallel orientation with respect to the first box-channel and the second box-channel; with the proviso that steps (2) through (11) can be carried out in any order.

8. The method as specified in claim 7 which further comprises attaching articulating or non-articulating connection hardware to the bottom side of the structural frame section, wherein the articulating or non-articulating connection hardware facilitates the interconnection of additional structural frame sections.

9. The method as specified in claim 7 which further comprises attaching at least one float to the bottom side of the structural frame section.

10. The method as specified in claim 7 which further comprises attaching at least one roller to the bottom side of the structural frame section.

11. The method as specified in claim 7 which further comprises attaching one or more floats to the bottom side of the structural frame section.

12. The method as specified in claim 7 which further comprises attaching a multitude of planks to the top side of the structural frame section to form a deck.

13. The method as specified in claim 7 wherein the cross-braces are attached to the first box-channel and the second box-channel by being bolted thereto.

14. A method for constructing a marine deck structure which comprises interconnecting two or more of the structural frame sections made by the method as specified in claim 7.

15. A method for constructing a marine deck structure which comprises interconnecting two or more of the structural frame sections made by the method as specified in claim 12.

* * * * *